US005941413A

United States Patent [19]

Roman

[11] Patent Number: 5,941,413

[45] Date of Patent: Aug. 24, 1999

[54] MANUAL LABEL DISPENSER ACCOMMODATING PLURAL SOURCES OF VARYING WIDTHS

[75] Inventor: Daniel P. Roman, Westmont, Ill.

[73] Assignee: Filing Systems, Inc., Madison Heights, Mich.

[21] Appl. No.: 09/002,169

[22] Filed: Dec. 31, 1997

[51] Int. Cl.$^{6}$ .............................. B65H 5/28; B65G 59/00

[52] U.S. Cl. ................................ 221/73; 221/70; 221/92; 156/584

[58] Field of Search ................................ 221/73, 70, 131, 221/92, 241, 242; 156/584, 33 D, 37 D, 48 D

[56] References Cited

U.S. PATENT DOCUMENTS

| | | | |
|---|---|---|---|
| 1,641,259 | 9/1927 | Fisher . | |
| 2,250,774 | 7/1941 | Piller . | |
| 2,754,994 | 7/1956 | Cole | 156/48 D |
| 2,912,140 | 11/1959 | Cole | 221/70 |
| 3,079,827 | 3/1963 | Castelli . | |
| 3,437,234 | 4/1969 | Izen et al. | 221/242 |
| 3,514,016 | 5/1970 | Hackney . | |
| 3,568,881 | 3/1971 | Croney | 221/73 |
| 3,672,550 | 6/1972 | Greco . | |
| 3,991,906 | 11/1976 | Oglander et al. . | |
| 4,252,258 | 2/1981 | Plummer, III . | |
| 4,493,446 | 1/1985 | Wirth . | |
| 4,530,472 | 7/1985 | Voss et al. . | |
| 4,574,979 | 3/1986 | Hackett . | |
| 4,979,414 | 12/1990 | Caveney et al. . | |
| 5,570,809 | 11/1996 | Martin | 221/70 |

OTHER PUBLICATIONS

Dispensa–Matic Label Dispensers, Promotional Literature captioned “Afix all types of . . . ,” Jan. 1, 1993, 2 pages, St. Louis, MO.

Dispensa–Matic Label Dispensers, Operating Instructions For Select–A–Matic Label Dispenser Model “D–5” (product insert), not dated, 1 page, St. Louis, MO.

*Primary Examiner*—Kenneth Noland
*Assistant Examiner*—Joe Dillon, Jr.
*Attorney, Agent, or Firm*—Brooks & Kushman P.C.

[57] ABSTRACT

A label dispenser includes a frame whose upper surface defines, in lateral cross-section, an arcuate trough within which to receive a supply of spiral-wound label-bearing linings or rolls. A pair of guide rods mounted on the frame in parallel-spaced relation to the trough’s front edge guide the end of each lining first upwardly and then sharply downwardly so as to cause separation of individual labels from their respective linings upon movement of each lining relative to the guide rods. At least one spacer engages each guide rod at a like location intermediate the rod’s ends so as to maintain the relative position of each guide during operation of the dispenser thereby to eliminate deleterious lateral deflection of one or more of the guide rods. Another rod is mounted on the frame in parallel-spaced relation to the trough’s rear edge. Dividers slidably and pivotally supported by the rearward rod provide lateral support for the individual linings.

15 Claims, 2 Drawing Sheets

MANUAL LABEL DISPENSER ACCOMMODATING PLURAL SOURCES OF VARYING WIDTHS

TECHNICAL FIELD

The invention relates to apparatus for randomly manually dispensing pre-cut self-adhesive labels from several independent spiral-wound label-bearing linings, particularly where at least two of the linings have different nominal widths.

BACKGROUND ART

The prior art teaches a variety of apparatus for dispensing labels, one label at a time, from one or more "rolls" of self-adhesive labels, i.e., spiral-wound linings upon which individual, precut labels are removably secured. Frequently, such label dispensers include a frame with which to support each individual roll. The dispensers often include a plurality of elongate guide elements mounted to the frame at their respective ends. The guide elements cooperate to define, along their lengths, a serpentine path through which each roll's label-bearing lining may be individually drawn. Individual labels on a given roll are sequentially separated from the lining as the lining is drawn through the guide elements.

Unfortunately, as the number of linings (rolls) in the dispenser increases, with a further correlative increase in the spacing between the frame mounts for the guide elements, the likelihood of relative lateral deflection of one or more of the guide elements similarly increases. The lateral deflection of the guide elements is known to substantially increase the relative tension which must be applied to a given roll's lining in order to draw it through the serpentine path defined by the guide elements. The lateral deflection of the guide elements may further affect the angle at which labels separate from the lining, often resulting in the attachment of serially-separated labels to one another in a fashion commonly known as "shingling."

In accordance with another known dispenser, the dispenser includes a spindle or rod for supporting a roll of labels relative to the dispenser's frame. Often, such rolls are provided with an annular core of nominal diameter within which to receive the spindle, whereby the rolls is better able to rotate on the spindle. Where labels from several rolls are to be available for dispensing, such known dispensers often use a single spindle with which to support each of the several rolls. Unfortunately, the use of a common spindle with which to support multiple rolls requires removing and/or disturbing each and every roll in order to change any given roll. Moreover, under such prior art designs, each roll must necessarily have an inner diameter at least as great as the nominal outer diameter of the common spindle.

Under yet another approach of prior art dispensers, each of the several rolls of labels to be dispensed is placed in its own "compartment" defined within the dispenser frame. Often, these compartments are of fixed dimension. As a result, when the width of any given roll is substantively less than that of its compartment, the roll may twist, causing shoddy dispensation. Of course, the width of any given roll can be no greater than the width of its respective compartment and, hence, dispensation of still wider labels using such dispensers is not possible. A further problem associated with such compartments is that the compartment walls often present "catch points" causing the labels to prematurely release from the liner, resulting in a jam.

DISCLOSURE OF INVENTION

It is an object of the invention to provide a dispenser for manually dispensing pre-cut labels from at least two spiral-wound label-bearing linings which obviates the need for removal of a lining-supporting spindle or other liner-supporting structure when inserting or removing any one or more of the wound linings.

It is also an object of the invention to provide a dispenser for manually dispensing pre-cut labels from a plurality of spiral-wound linings which features consistent lining tension with which to cause separation of a label from any given lining, notwithstandin the relative lateral position of the lining in the dispenser.

Under the invention, a dispenser for manually dispensing pre-cut labels from a plurality of spiral-wound linings includes a frame having a laterally-extending surface defining in an upwardly-opening arcuate trough adapted to receive the linings. In a preferred embodiment, the trough is provided with a substantially constant curvature between the trough's parallel-spaced front and rear edges, with the trough's front edge being positioned higher on the frame than the rear edge.

A first elongate guide element, such as a first smooth-surfaced guide rod, is supported by the frame in spaced relation with the front edge of the trough. A second elongate guide element, such as a second smooth-surfaced guide rod, is supported by the frame in parallel-spaced relation with the first guide element. The first and second guide rods are operative to separate the labels from the linings as each lining is respectively drawn over the first guide rod and then between the first and second guide rods.

In accordance with the invention, at least one guide rod spacer is supported by the first and second guide rods, respectively, and is laterally movable on the first and second guide rods with respect to the frame. Each spacer acts to maintain the nominal separational distance between the first and second guide rods at a point intermediate the ends of the dispenser. In this manner, the spacer prevents the lateral deflection of one guide rod relative to another guide rod proximate to the spacer and, hence, ensures that the relative tension which must be applied by a dispenser operator to a given lining in order to draw the lining over and between the first and second guide rods, respectively, is not substantially affected by the relative lateral position of the given lining in the dispenser. Under the invention, the number of spacers is preferably correlated with overall lateral dimension of the trough, and each spacer is axially movable on the first and second guide rods relative to the dispenser's frame such that each spacer may be selectively moved to accommodate disparate lining widths.

Under the invention, the dispenser may further include a third guide element supported by the frame in parallel-spaced relation to the first guide rod. In a preferred embodiment, the third guide element is a front tie rod extending laterally between a pair of side panels of the frame. The front tie rod is operative to provide temporarily support for a label which has been separated from one of the spiral-wound linings but has not otherwise been removed from the dispenser by the dispenser operator.

In the preferred embodiment, the front tie rod has an external thread to lessen the adhesion of any given label temporarily supported thereby. Where the dispenser has such a third guide element, the spacer is preferably further supported by the third guide element, with the spacer being laterally movable on the third guide element with respect to the frame.

In accordance with another feature of the invention, the dispenser preferably further includes at least one divider pivotally mounted on the frame so as to be movable laterally on the frame relative to its side panels. In this manner, the dividers may be laterally repositioned to accommodate disparate lining widths while pivoting to facilitate insertion and removal of a given lining from the dispenser without disruption to adjacent linings.

While embodiments of this invention are illustrated and disclosed, these embodiments should not be construed to limit the claims. It is anticipated that various modifications and alternative designs may be made without departing from the scope of this invention.

BEST MODES FOR CARRYING OUT THE INVENTION

Figure 1:
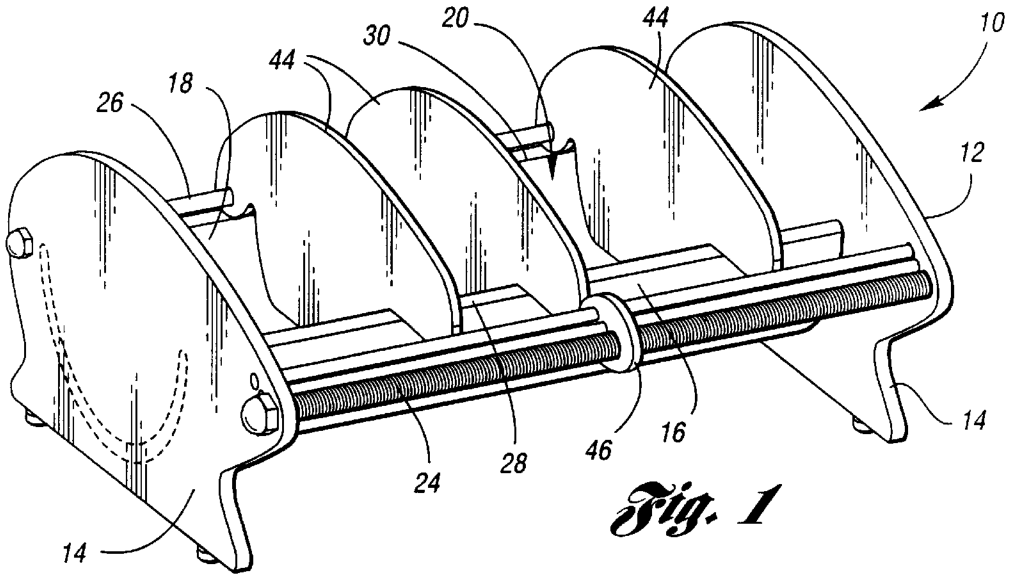
FIG. 1 is a perspective view of a first exemplary label dispenser in accordance with the invention.
Figure 2:
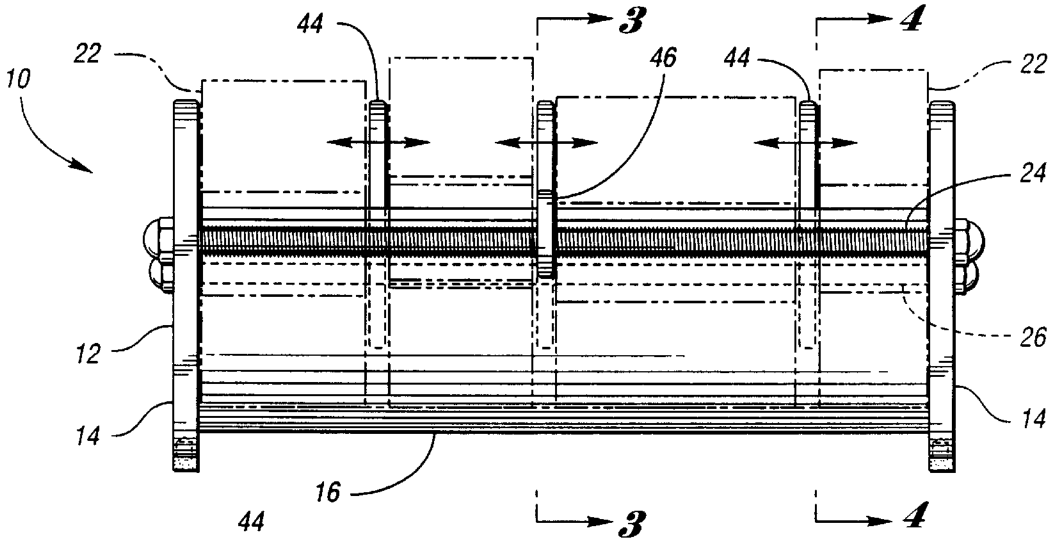
FIG. 2 is an front elevational view of the first dispenser further illustrating in phantom four rolls of labels, each roll being of a different nominal width and having a different inner diameter, with but two of the rolls being wound about a core.

A first exemplary label dispenser 10 in accordance with the invention is shown in FIGS. 1–5. Specifically, as seen in the perspective view shown in FIG. 1 and the front view shown in FIG. 2, the first exemplary dispenser 10 includes a frame 12 having a pair of generally-planar side panels 14 and an elongate lateral member 16 which defines, with its upper surface 18, an arcuate trough 20 within which to receive and support a supply of independent spiral-wound label-bearing linings ("rolls 22"). By way of illustration only, four such rolls 22 are shown in phantom lines in FIG. 2, while one such roll 22 has been added to the sectional view of the first dispenser 10 illustrated in FIG. 4. It will be appreciated that, while FIGS. 1 and 2 show the first dispenser 10 as capable of receiving four such rolls 22, the invention specifically contemplates simultaneous receipt within the trough 20 of a number of rolls 22 significantly greater than four.

The frame 12 of the first dispenser 10 further includes a pair of tie rods 24,26 extending between the side panels 14 in parallel-spaced relation to the front and back edges 28,30 of the trough 20, respectively.

Figure 3:
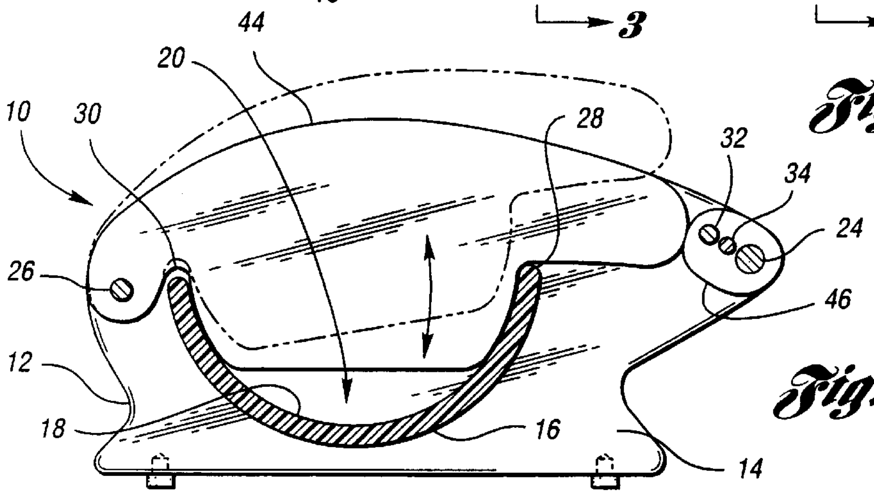
FIG. 3 is a sectional view of the first dispenser along line 3—3 of FIG. 2, further showing in phantom lines one of the dispenser's dividers pivoted up to facilitate insertion or removal of a roll of labels.
Figure 4:
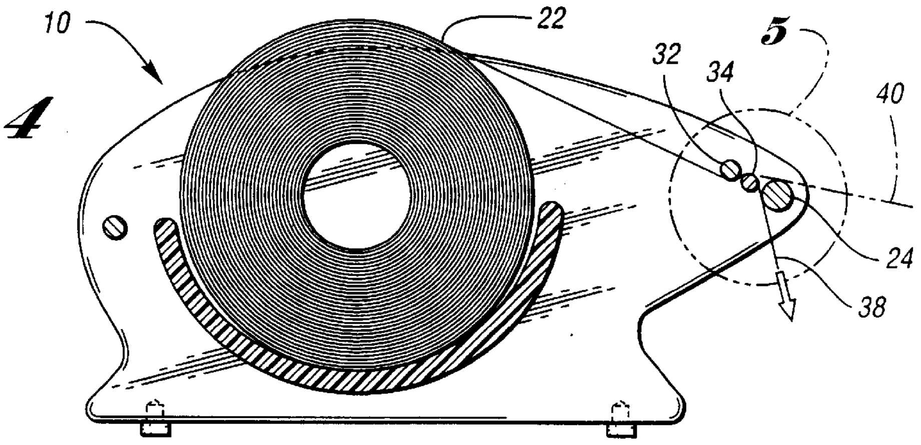
FIG. 4 is another sectional view of the first dispenser along line 4—4 of FIG. 2, further showing a roll of labels in the dispenser with the roll's lining being drawn through the dispenser's guide rods.

As seen more clearly in FIGS. 3 and 4, the radiused front edge 28 of the trough 20 facilitates smooth engagement of the roll 22 with the trough 20 while further reducing the likelihood that a leading edge of a partially-detached label situated on the outside of a roll 22 will "catch" the front edge 28 or otherwise attach itself to the trough 20. In this regard, it is noted that, in the first dispenser 10, the lateral member 16 which defines the trough 20 is secured to the side panels 14 such that the front edge 28 is higher on the frame 12 than the back edge 30, thereby further reducing the likelihood that partially-detached labels will catch on the trough's front edge 28. As seen in the drawings, the front and back edges 28,30 of the trough 20 may be parallel to one another to improve the aesthetic appeal of the dispenser 10.

Figure 5:
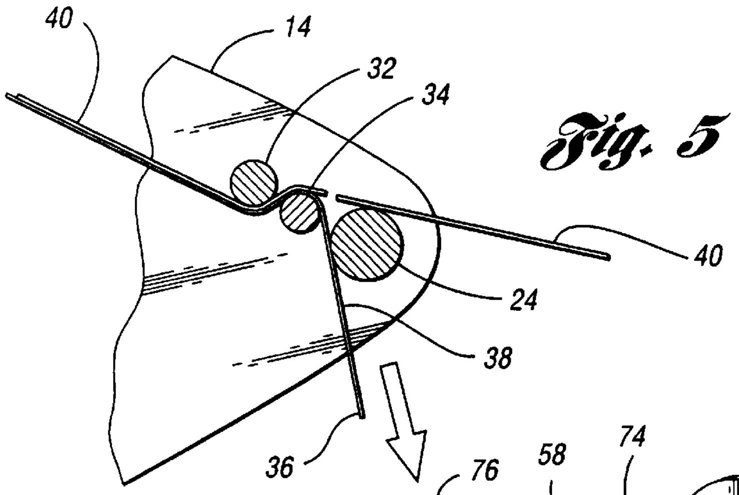
FIG. 5 is an exploded view of the guide rods within circle 5 of FIG. 4.

A pair of smooth-surfaced guide rods 32,34 extend between the frame's side panels 14 in parallel-spaced relation to each other and to both the front edge 28 of the trough 20 and the front tie rod 24. As seen in FIGS. 4 and 5, the two guide rods 32,34 serve to guide the end 36 of each roll's lining 38 first upwardly and then sharply downwardly so as to cause sequential separation of individual labels 40 from the lining 38 upon downward movement of the lining 38 relative to the frame 12.

In accordance with another feature of the invention, the two guide rods 32,34 are positioned intermediate the front edge 28 of the trough 20 and the front tie rod 24. In this manner, the front tie rod 24 functions as a third guide rod to ensure that the roll's lining 38 is properly directed sharply downwardly after passing over the second guide rod 34, even when a dispenser operator pulls the lining 38 outwardly from the frame 12. Moreover, as seen in FIG. 5, in the event that a dispenser operator pulls downwardly on the end 36 of a roll 22, thereby separating a label 40 from the roll's lining 38, but does not otherwise immediately remove the separated label 40 from the dispenser 10, the separated label 40 will drop to engage, and thereafter be temporarily retained upon the front tie rod 24.

In accordance with another feature of the invention, in the first exemplary dispenser 10, the longitudinal axes of the two guide rods 32,34 and the front tie rod 24 lie within the same plane, as seen in FIGS. 3–5. And, while the invention contemplates use of a front tie rod 24 of any suitable configuration, as seen in FIG. 5, the front tie rod 24 preferably of circular cross-section and includes an external thread with which to only slightly engage the self-adhesive underside 42 of a given separated label 40 which falls into contact with the thread. The label 40 may thereafter be easily removed from the front tie rod 24 when required.

As seen in FIGS. 1–3, a plurality of dividers 44 are slidably and pivotally supported on the rear tie rod 26 and generally extend so as to rest on the front edge 28 of the trough 20. The dividers 44 provide lateral support for the rolls 22 placed in the trough 20. The dividers 44 are movable laterally on the rear tie rod 26 so as to accommodate rolls 22 of different nominal widths. As seen in FIG. 3, the dividers 44 may be pivoted about the rear tie rod 26 so as to facilitate insertion or removal of any given roll 22 without disruption to adjacent rolls 22 supported within the trough 20.

A spacer 46 is supported by the two guide rods 32,24 and the front tie rod 24. More specifically, as best seen in FIG. 3, the spacer 46 includes three bores within which to respectively slidably receive the two guide rods 32,34 and the front tie rod 24. The spacer 46 acts to maintain the nominal separational distances between the guide rods 32,34 and the front tie rod 24, respectively, at a point intermediate the side panels 14 of the dispenser 10. In this manner, the dispenser 10 thereby to ensure optimal dispenser performance by preventing the relative deflection of the guide rods 32,34 proximate to the spacer 46 which, in turn, ensures that the relative tension which must be applied by a dispenser operator to a given roll's lining 38 in order to draw the lining 38 through the guide rods 32,34 is not substantially affected by the relative lateral position of the given roll 22 in the dispenser 10.

Under the invention, the number of spacers 46 is preferably correlated with the nominal lateral spacing between the dispenser's side panels 14. By way of example only, where the nominal width of the rolls 22 ranges between perhaps about 0.75 inches and about 4 inches, the dispenser a nominal spacing between a given side panel 14 and a spacer 46, or the relative lateral spacing between spacers 46, preferably does not exceed about 12 to 15 inches.

In accordance with another feature of the invention, the spacer 46 is movable on the guide rods 32,34 and the front tie rod 24 relative to the dispenser's side panels 14 such that the spacer 46 may be selectively moved into lateral alignment with one of the dividers 44 after the dividers 44 have been positioned to accommodate the relative widths of the rolls 22 to be dispensed.

While the spacer 46 may be formed of any suitable material, the spacer 46 may preferably be formed of the same material as the dividers 44, the side panels 14 and the lateral member 16 to provide the dispenser 10 with increased aesthetic appeal. By way of example only, each of the dividers 44, the side panels 14 and the lateral member 16 of the first exemplary dispenser 10 are formed of a clear acrylic material. Similarly, while the spacer 46 may be formed to any suitable width, the spacer 44 preferably has the same nominal width as each divider 44.

In accordance with another feature of the invention, the arcuate trough 20 is readily formed from a planar sheet of material or, alternatively, is formed as a partial section of a preformed tube (the latter conveniently providing the trough 20 with a substantially constant curvature, as seen in FIGS. 3 and 4).

Figure 6:
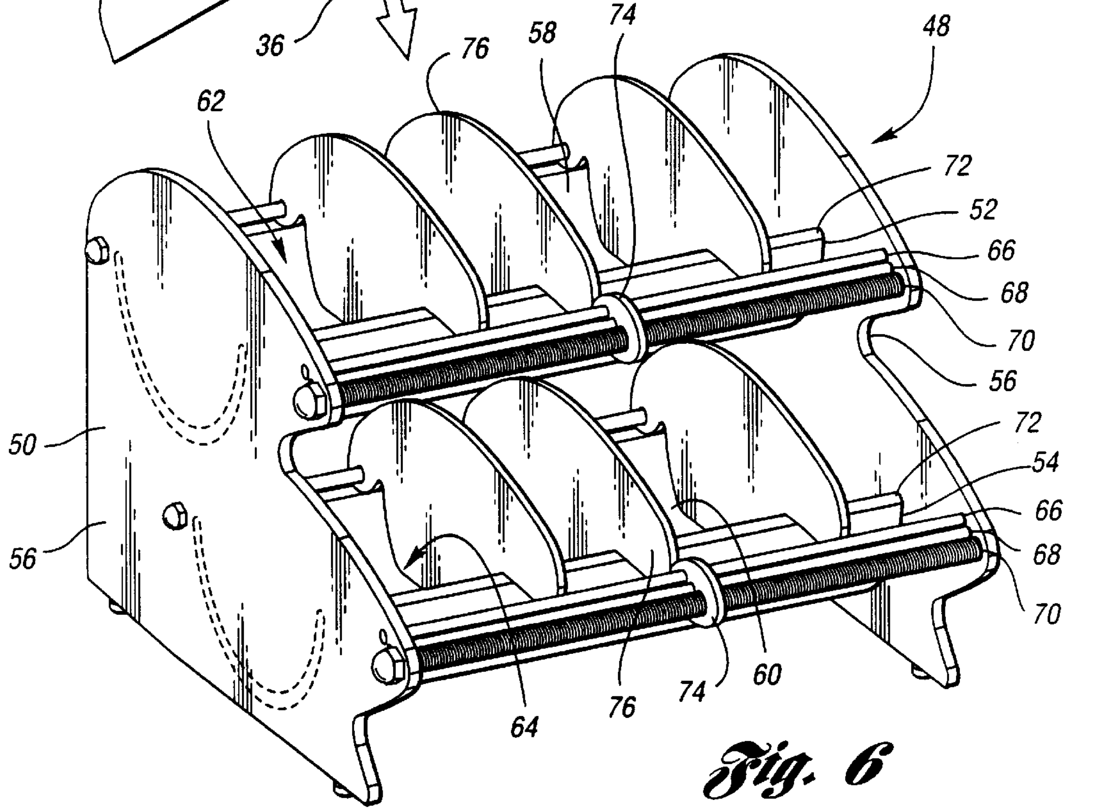
FIG. 6 is a perspective view of a second exemplary label dispenser in accordance with the invention featuring two parallel-spaced, vertically stacked troughs from which to dispense labels.

A second exemplary dispenser 48 is shown in FIG. 6. The second dispenser 48 has a frame 50 which includes two parallel-spaced members 52,54 that extend laterally between a pair of side panels 56. The upper surfaces 58,60 of the two lateral members 52,54 define a pair of upwardly-opening parallel-spaced troughs 62,64 within which to receive and support a plurality of rolls 22 of self-adhesive labels 40. As in the first exemplary dispenser 10, a pair of guide rods 66,68 and a front tie rod 70 are mounted to the frame 50 of the second dispenser 50 in parallel-spaced relation to the front edge 72 of each of the troughs 62,64, respectively.

As in the first dispenser 10, the guide rods 66,68 of the second dispenser 48 cooperate with the front tie rod 70 to define a serpentine path through which the lining of each roll may be selectively drawn. Similarly, a spacer 74 is supported by the guide rods 66,68 and front tie rod 70 proximate to each of the troughs 62,64 so as to maintain the relative separation between the guide rods 66,68 and the front tie rod 70 when a dispenser operator draws one or more linings therethrough. Each spacer 74 is axially movable on the guide rods 66,68 and the front tie rod 70, whereby each spacer 74 may be aligned with one of several dividers 76 after the latter are laterally positioned on the frame 50 to accommodate the nominal widths of the rolls of labels to be dispensed.

While the preferred embodiments of the invention have been disclosed, it should be appreciated that the invention is susceptible of modification without departing from the spirit of the invention or the scope of the subjoined claims. For example, while the first and second exemplary dispensers 10,48 each include a single spacer 46 by which to maintain the guide rods 32,34 and the front tie rod 24 in parallel-spaced relation, it will be appreciated that the invention contemplates use of additional spacers 46 as the relative lateral distance between the side panels 14 increases.

What is claimed is:

1. An apparatus for randomly dispensing pre-cut self-adhesive labels, the labels being removably secured to each of at least two spiral-wound linings, the apparatus comprising:

a frame having a surface defining in an upwardly-opening arcuate trough adapted to receive the linings, the trough having a front edge and a rear edge;

a first elongate guide element supported by the frame in spaced relation with the front edge of the trough;

a second elongate guide element supported by the frame in parallel-spaced relation with the first guide element; and a spacer supported by the first and second guide elements, respectively, the spacer being movable on the first and second guide elements with respect to the frame, wherein the first and second guide elements are operative to separate the labels from the spiral-wound linings when the linings are respectively drawn over the first guide element and then between the first and second guide elements, and wherein the spacer maintains the first and second guide elements in substantially parallel-spaced relation.

2. The apparatus of claim 1, wherein the trough is provided with a substantially constant curvature between the front edge and the rear edge.

3. The apparatus of claim 1, wherein the first and second guide elements are a pair of smooth-surfaced rods.

4. The apparatus of claim 1, further including at least one divider pivotally mounted on the frame, the divider being movable laterally on the frame relative to a first end of the frame.

5. The apparatus of claim 1, wherein the front edge is positioned higher on the frame than the rear edge.

6. The apparatus of claim 5, wherein the front edge of the trough is parallel to the rear edge of the trough.

7. The apparatus of claim 1, further including a third guide element supported by the frame in parallel-spaced relation to the first guide element, the third guide element being operative to provide temporary support for a label separated from one of the spiral-wound linings.

8. The apparatus of claim 7, wherein the third guide element is an elongate rod having an external thread.

9. The apparatus of claim 7, wherein the spacer is further supported by the third guide element, and the spacer is movable on the third guide element with respect to the frame.

10. An apparatus for dispensing self-adhesive labels from a first plurality of spiral-wound linings comprises:

a frame including a first side panel, a second side panel laterally spaced from the first side panel, and a first elongate member extending laterally between the first side panel and the second side panel, the first member including an upper surface defining a first arcuate trough extending between the first side panel and the second side panel within which to receive the first plurality of linings, the first trough having a front edge and a rear edge;

a first elongate guide element extending laterally between the first side panel and the second side panel in spaced relation with the front edge of the first trough;

a second elongate guide element extending laterally between the first side panel and the second side panel in parallel-spaced relation with the first guide element; and a spacer supported by the first and second guide elements, respectively, the spacer being laterally movable on the first and second guide elements with respect to the frame, wherein the first and second guide elements are operative to separate the labels from the first plurality of linings when the first plurality of linings are respectively drawn over the first guide element and then between the first and second guide elements, and wherein the spacer maintains the first and second guide elements in substantially parallel-spaced relation.

11. The apparatus of claim 10, wherein the first trough has a substantially constant radius in longitudinal cross-section.

12. The apparatus of claim 10, further including at least one divider pivotally mounted on the frame, the divider being movable laterally on the frame relative to a first end of the frame.

13. The apparatus of claim 10, further including a second elongate member extending laterally between the first side panel and the second side panel, the second member including an upper surface defining a second arcuate trough extending between the first side panel and the second side panel within which to receive a second plurality of spiral-wound linings, the second trough having a front edge and a rear edge;

a fourth elongate guide element extending laterally between the first side panel and the second side panel in spaced relation with the front edge of the second trough;

a fifth elongate guide element extending laterally between the first side panel and the second side panel in parallel-spaced relation with the fourth guide element; and a second spacer supported by the fourth and fifth guide elements, respectively, the second spacer being laterally movable on the fourth and fifth guide elements with respect to the frame, wherein the fourth and fifth guide elements are operative to separate the labels from the second plurality of spiral-wound linings when the second plurality of linings are respectively drawn over the fourth guide element and then between the fourth and fifth guide elements, and wherein the spacer maintains the fourth and fifth guide elements in substantially parallel-spaced relation.

14. The apparatus of claim 10, further including a third guide element extending laterally between the first side panel and the second side panel in parallel-spaced relation to the first guide element and the second guide element, respectively, the third guide element being operative to provide temporary support for a label separated from one of the first plurality of linings.

15. The apparatus of claim 14, wherein the spacer is further supported by the third guide element, and the spacer is laterally movable on the third guide element with respect to the frame.

* * * * *